(12) United States Patent
Maertz

(10) Patent No.: US 8,602,485 B2
(45) Date of Patent: Dec. 10, 2013

(54) DRAG REDUCER FOR SEMI-TRAILER

(71) Applicant: Scott Maertz, Sheboygan, MI (US)

(72) Inventor: Scott Maertz, Sheboygan, MI (US)

( * ) Notice: Subject to any disclaimer, the term of this patent is extended or adjusted under 35 U.S.C. 154(b) by 11 days.

(21) Appl. No.: 13/624,482

(22) Filed: Sep. 21, 2012

(65) Prior Publication Data

US 2013/0076067 A1    Mar. 28, 2013

Related U.S. Application Data

(60) Provisional application No. 61/540,504, filed on Sep. 28, 2011.

(51) Int. Cl.
*B62D 35/00* (2006.01)

(52) U.S. Cl.
USPC ..................... 296/180.4; 296/180.1

(58) Field of Classification Search
USPC ............. 296/180.1, 180.4, 180.2, 181.5, 208
See application file for complete search history.

(56) References Cited

U.S. PATENT DOCUMENTS

| | | | |
|---|---|---|---|
| 6,561,575 B2 | 5/2003 | Fairburn |
| 6,685,256 B1 | 2/2004 | Shermer |
| 6,779,834 B1 | 8/2004 | Keller |
| 7,165,804 B2 | 1/2007 | Shahbazi |
| 7,625,034 B1 | 12/2009 | Fitzgerald |
| 7,694,774 B2 | 4/2010 | Breakfield |
| 7,712,821 B2 | 5/2010 | Gomez |
| 7,992,666 B2 | 8/2011 | Otterstrom |
| 8,196,996 B1 | 6/2012 | Campbell |
| 2009/0212598 A1 | 8/2009 | Otterstrom |

*Primary Examiner* — Joseph Pape
*Assistant Examiner* — Dana Ivey
(74) *Attorney, Agent, or Firm* — Steven Fisher-Stawinski; The Gray Law Group, Ltd

(57) ABSTRACT

The invention is a drag reducer for use in commercial semi-trailers, trucks, cargo containers, rail cars, and the like. The drag reducer takes the form of a hollow fluid conduit that collects fast moving air from under the trailer while the truck is moving at speed and forces it through vertical hollow fluid conduit up and around the sides of the trailer's rear door. Small holes facing outward from the vertical hollow fluid conduit eject the air in a direction perpendicular to the direction of motion, thereby reducing overall drag on the trailer. At least two hollow fluid conduits are contemplated, with at least one hollow fluid conduit being vertically placed, and at least one hollow fluid conduit being placed horizontally in each system.

14 Claims, 2 Drawing Sheets

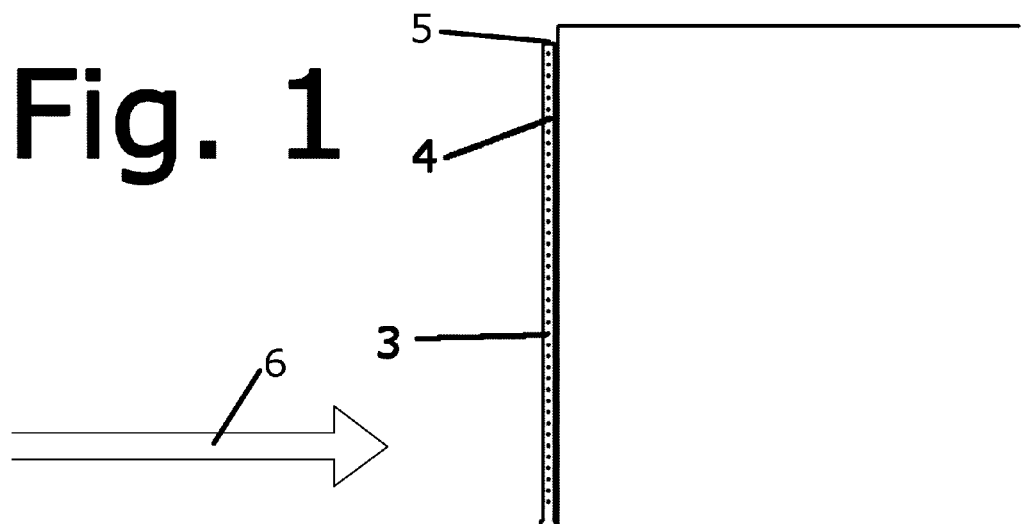
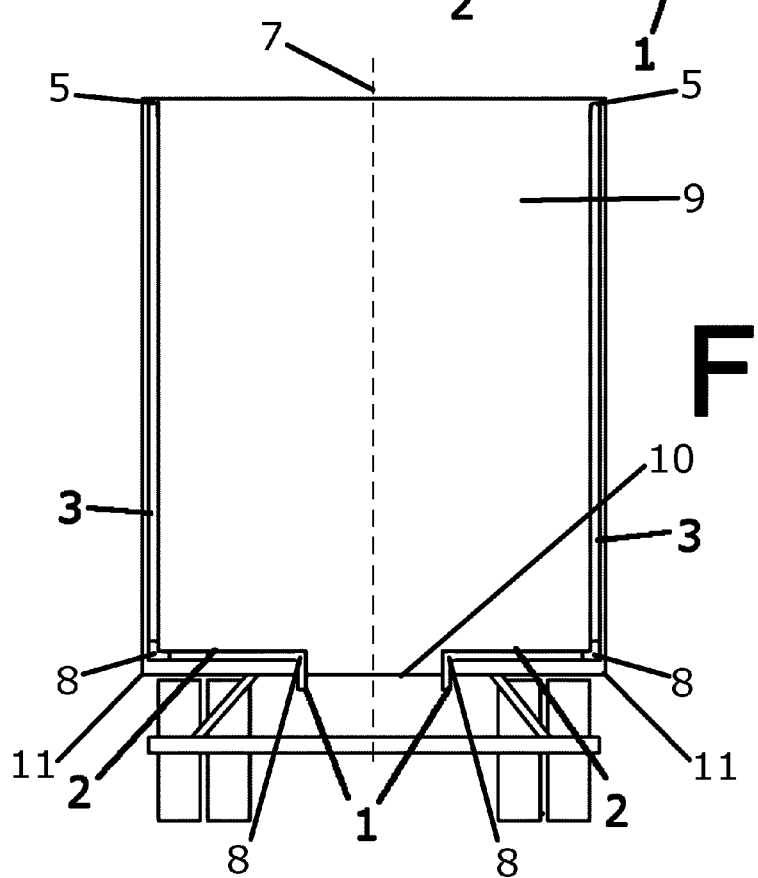

DRAG REDUCER FOR SEMI-TRAILER

CROSS-REFERENCE TO RELATED APPLICATIONS

This application claims priority to U.S. Provisional Patent Application No. 61/540,504 filed Sep. 28, 2011, which is hereby incorporated by reference.

STATEMENT REGARDING FEDERALLY SPONSORED RESEARCH OR DEVELOPMENT

Not Applicable

PARTIES TO A JOINT RESEARCH AGREEMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The invention relates generally to the field of accessories for commercial trucks, and specifically to devices that reduce drag on trucks, thereby improving trucks' energy efficiency and reducing fuel cost. Numerous air flow conduits and foils are taught in the prior art to reduce drag and increase fuel economy on trucks, trailers, cargo containers, railway cars, and the like. These devices, however, typically focus on distributing air flow from the top, bottom, front, or sides of the vehicle to the rear. No known device distributes air in an outward direction near the rear.

SUMMARY OF THE INVENTION

Accordingly, the invention is a drag reducer for use in commercial semitrailers, trucks, cargo containers, rail cars, and the like. The drag reducer takes the form of a hollow fluid conduit that collects fast moving air from under the trailer while the truck is moving at speed and forces it through a vertical hollow fluid conduit up and around the sides of the trailer's rear door. Small holes facing outward from the vertical hollow fluid conduit eject the air in a direction perpendicular to the direction of motion, thereby reducing overall drag on the trailer.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

BRIEF DESCRIPTION OF THE DRAWINGS

The accompanying drawings are included to provide a further understanding of the invention and are incorporated into and constitute a part of the specification. They illustrate one embodiment of the invention and, together with the description, serve to explain the principles of the invention.

In the drawings:

FIG. 1 illustrates a side view of the invention installed on the rear of a semi-trailer, displaying the axial hollow fluid conduits (1), the horizontal hollow fluid conduits (2), the vertical hollow fluid conduits (3), the holes (4), the caps (5), the direction of forward motion (6), and the bottom surface (10).

FIG. 2 illustrates a rear view of the invention installed on the rear of a semi-trailer, displaying the axial hollow fluid conduits (1), the horizontal hollow fluid conduits (2), the vertical hollow fluid conduits (3), the caps (5), the vertical centerline (7), the right-angle fluid conduits (8), the rear surface (9), the bottom surface (10), and the lower outer corners (11).

DETAILED DESCRIPTION OF THE INVENTION

Figure 3:
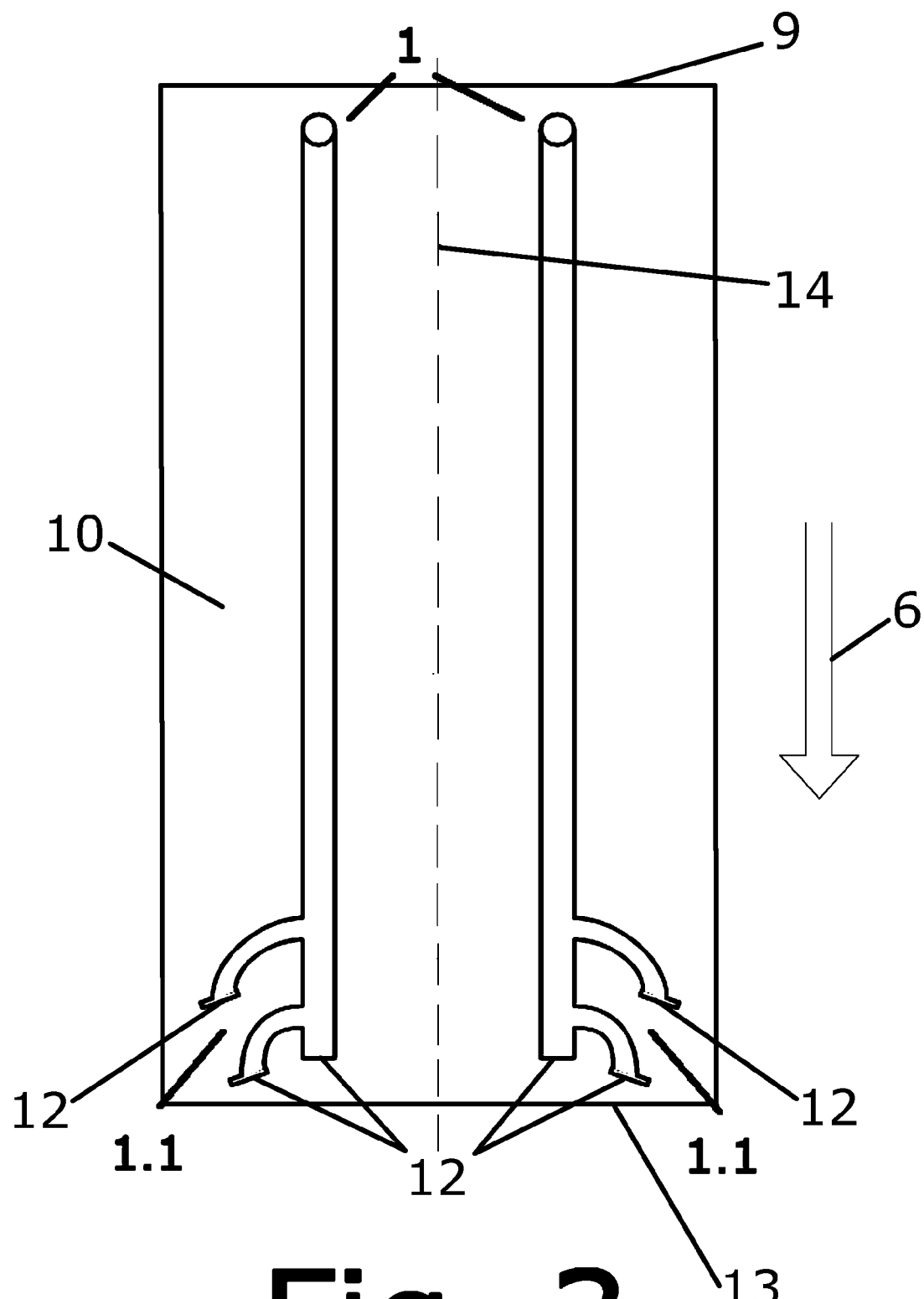
FIG. 3 illustrates an exemplary embodiment of the invention's branch fluid conduits, displaying the axial hollow fluid conduits (1), the branch fluid conduits (1.1), the direction of forward motion (6), the axial centerline (14), the bottom surface (10), the openings (12), and the front surface (13).

Referring now to the invention in more detail, FIG. 1 shows a side view of the rear of a commercial semi-trailer rig, FIG. 2 shows the rear view of the rig, and FIG. 3 shows an exemplary branch fluid conduit. The embodiment shown is intended for use with a commercial semi-trailer truck, however alternative embodiments in which the invention is applied to full trailers, fixed trucks, buses, locomotives, and similar vehicles having a generally oblong and aerodynamically unfriendly shape are contemplated. Like numbers refer to like parts in the drawings. The invention, in the embodiment shown, comprises two hollow fluid conduit systems mounted on either side of the truck, which are mirror images of one another and function identically.

In each hollow fluid conduit system, air is collected through forward facing branch fluid conduits (1.1) in the axial hollow fluid conduit (1) on the bottom surface (10) of the rig. As shown, the axial hollow fluid conduits (1) have two openings (12) on short branch fluid conduits (1.1), however other embodiments may utilize more, fewer, or no branch fluid conduits, and any number of openings (12) (though at least one).

Air is forced into the openings (12) by the motion of the truck at speed.

The pressure on the air in the axial hollow fluid conduits (1) forces it out rear openings into horizontal hollow fluid conduits (2), which are connected by systems of two right-angle conduits 8, which conduct the air outward to the edges of the truck and out top openings in the horizontal hollow fluid conduits (2), which are mounted on the bottom edges of the rear surface (9) of the truck. From the horizontal hollow fluid conduits (2), air is forced into a vertical hollow fluid conduits (3) into which have been drilled a series of small holes (4) that open outward, perpendicular to the axial centerline (14) of the vehicle and parallel to the vertical centerline 7 of the vehicle. The vertical hollow fluid conduits 3 are closed at the top by caps (5), which keep pressure to ensure that air escapes primarily through the holes (4). As the air is forced outward from the holes (4), it interacts with the air moving past the exterior of the truck to reduce drag.

The hollow fluid conduit for the entire invention may be of any material from which durable tubing can be made, such as steel or PVC. The hollow fluid conduit may be affixed to the trailer or truck body by brackets, the brackets being attached by bolts or rivets. These and many other fasteners and materials are known in the prior art.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein.

The invention should, therefore, not be limited by the above described embodiment, method, and examples, but by all embodiments and methods within the scope and spirit of the invention.

I claim:

1. A system for reducing drag on an oblong vehicle comprising:
   (a) a pair of vertical hollow fluid conduits;
   (b) each of said pair of vertical hollow fluid conduits being affixed to the rear surface of an oblong vehicle along one of the two rear vertical edges of said oblong vehicle;
   (c) said pair of vertical hollow fluid conduits having a plurality of holes along its length in a direction perpendicular to and outward from the axial centerline of said oblong vehicle;
   (d) each of said pair of vertical hollow fluid conduits having a cap at its upper vertical end;
   (e) a pair of axial hollow fluid conduits;
   (f) each of said pair of axial hollow fluid conduits being affixed to the underside of said oblong vehicle;
   (g) each of said pair of axial hollow fluid conduits having an opening, said opening being near its first end;
   (h) said openings being oriented toward the front surface of said oblong vehicle; and
   (i) each of said pair of said axial hollow fluid conduits being connected at its second end in fluid communication with the lower vertical end of one of said pair of vertical hollow fluid conduits;
   whereby airflow from the forward motion of said oblong vehicle is forced into said openings and directed through said pair of axial hollow fluid conduits and into said pair of vertical hollow fluid conduits and out of said plurality of holes in said pair of vertical hollow fluid conduits in a direction perpendicular to and outward from the centerline of said oblong vehicle, thereby reducing drag on said oblong vehicle.

2. The system of claim 1 wherein each of said pair of vertical hollow fluid conduits is in fluid communication with one of said pair of axial hollow fluid conduits, each via one of a pair of horizontal hollow fluid conduits, and where each of said pair of horizontal hollow fluid conduits is affixed to the rear surface of said oblong vehicle along a portion of the bottom edge of said rear surface.

3. The system of claim 2 wherein said pair of vertical hollow fluid conduits is connected to said pair of horizontal hollow fluid conduits by a pair of right-angle fluid conduits that are oriented to connect vertical flow to horizontal flow at the lower outer corners of the rear surface of said oblong vehicle.

4. The system of claim 2 wherein said pair of horizontal hollow fluid conduits is connected to said pair of axial hollow fluid conduits by a pair of combined systems of two right-angle fluid conduits, the first of said right-angle fluid conduits of each of said pair of combined systems converting horizontal flow to vertical flow at a point along the lower edge of the rear surface of said oblong vehicle, and the second of said right-angle fluid conduits of each of said pair of combined systems converting vertical flow to axial flow around the bottom edge of the rear surface of said oblong vehicle.

5. The system of claim 4 wherein both of said pair of combined systems of two right-angle fluid conduits and said pair of axial fluid conduits are located horizontally along the bottom and rear surfaces of said oblong vehicle at a pair of positions about one third of the distance from the outer edges of said oblong vehicle to the axial centerline of said oblong vehicle.

6. The system of claim 1 wherein:
   (a) each of said pair of vertical hollow fluid conduits is in fluid communication with one of said pair of axial hollow fluid conduits, each via one of said pair of horizontal hollow fluid conduits, and where each of said pair of horizontal hollow fluid conduits is affixed to the rear surface of said oblong vehicle along a portion of the bottom edge of said rear surface;
   (b) said pair of vertical hollow fluid conduits is connected to said pair of horizontal hollow fluid conduits by a pair of right-angle fluid conduits that are oriented to connect vertical flow to horizontal flow at the lower outer corners of the rear surface of said oblong vehicle;
   (c) said pair of horizontal hollow fluid conduits is connected to said pair of axial hollow fluid conduits by a pair of combined systems of two right-angle fluid conduits, the first of said right-angle fluid conduits of each of said pair of combined systems converting horizontal flow to vertical flow at a point along the lower edge of the rear surface of said oblong vehicle, and the second of said right-angle fluid conduits of each of said pair of combined systems converting vertical flow to axial flow around the bottom edge of the rear surface of said oblong vehicle; and
   (d) both of said pair of combined systems of two right-angle fluid conduits and said pair of axial hollow fluid conduits are located horizontally along the bottom and rear surfaces of said oblong vehicle at a pair of positions about one third of the distance from the outer edges to the centerline of said oblong vehicle.

7. The system of claim 1 wherein each of said openings further comprises a plurality of branch fluid conduits; each of said plurality of branch fluid conduits being curved outward from said pair of axial hollow fluid conduits to open in a forward or forward-angled direction with respect to the direction of forward motion of said oblong vehicle.

8. The system of claim 7 wherein each set of said plurality of branch fluid conduits associated with each of said pair of axial hollow fluid conduits is affixed to and in fluid communication with two branch fluid conduits.

9. The system of claim 5 wherein each of said openings further comprises a plurality of branch fluid conduits; each of said plurality of branch fluid conduits being curved outward from the axial hollow fluid conduits to open in a forward or forward-angled direction with respect to the direction of forward motion of said oblong vehicle.

10. The system of claim 9 wherein each set of said plurality of branch fluid conduits associated with each axial hollow fluid conduit is affixed to and in fluid communication with two branch fluid conduits.

11. The system of claim 8 wherein said pair of vertical hollow fluid conduits, said pair of axial hollow fluid conduits, and said pluralities of branch fluid conduits are made of PVC and are joined or fastened by adhesives.

12. The system of claim 8 wherein said pair of vertical hollow fluid conduits, said pair of axial hollow fluid conduits, and said pluralities of branch fluid conduits are made of steel, aluminum, or other metal, and are joined or fastened by welding.

13. The system of claim 10 wherein said pair of vertical hollow fluid conduits, said pair of axial hollow fluid conduits, said pair of horizontal hollow fluid conduits, said right-angle fluid conduits, and said pluralities of branch fluid conduits are made of PVC and are joined or fastened by adhesives.

14. The system of claim 10 wherein said pair of vertical hollow fluid conduits, said pair of axial hollow fluid conduits, said pair of horizontal hollow fluid conduits, said right-angle fluid conduits, and said pluralities of branch fluid conduits are made of steel, aluminum, or other metal, and are joined or fastened by welding.

* * * * *